Nov. 3, 1970  SUSUMU IHARA ET AL  3,538,435
METHOD AND APPARATUS FOR AUTOMATICALLY MEASURING
THE LENGTH OF A LONG MOVING OBJECT BY
SENSING STATIC ELECTRIC CHARGES
Filed July 22, 1968  4 Sheets-Sheet 1

INVENTORS
SUSUMU IHARA
MASAKI OHMORI
ISAMU SAMESHIMA
HIDETAKA YAMAGAMI
BY
ATTORNEYS

Nov. 3, 1970    SUSUMU IHARA ET AL    3,538,435
METHOD AND APPARATUS FOR AUTOMATICALLY MEASURING
THE LENGTH OF A LONG MOVING OBJECT BY
SENSING STATIC ELECTRIC CHARGES
Filed July 22, 1968                    4 Sheets-Sheet 2

INVENTORS
SUSUMU IHARA
MASAKI OHMORI
ISAMU SAMESHIMA
HIDETAKA YAMAGAMI
BY
ATTORNEYS

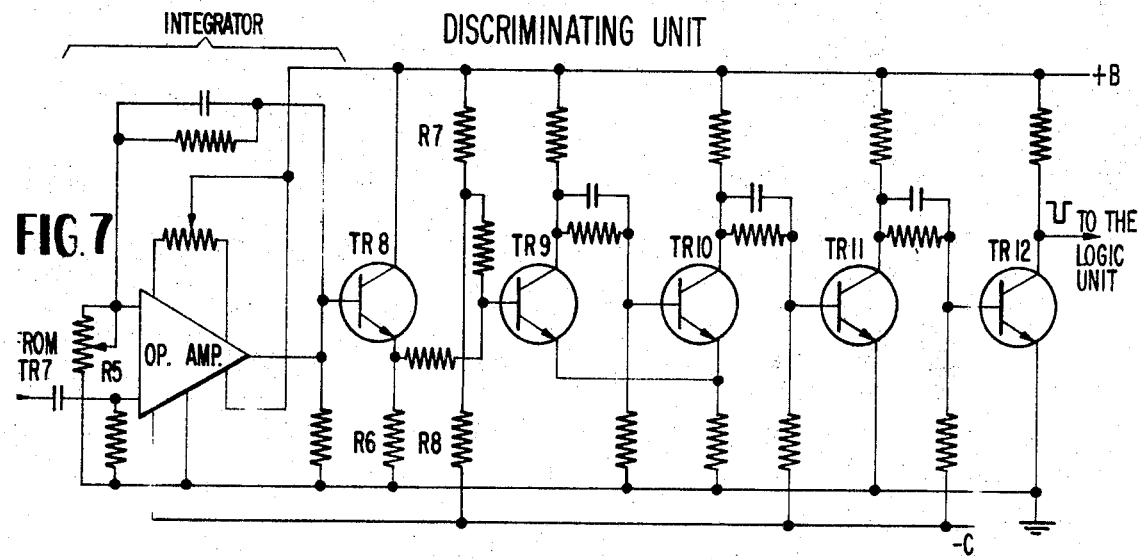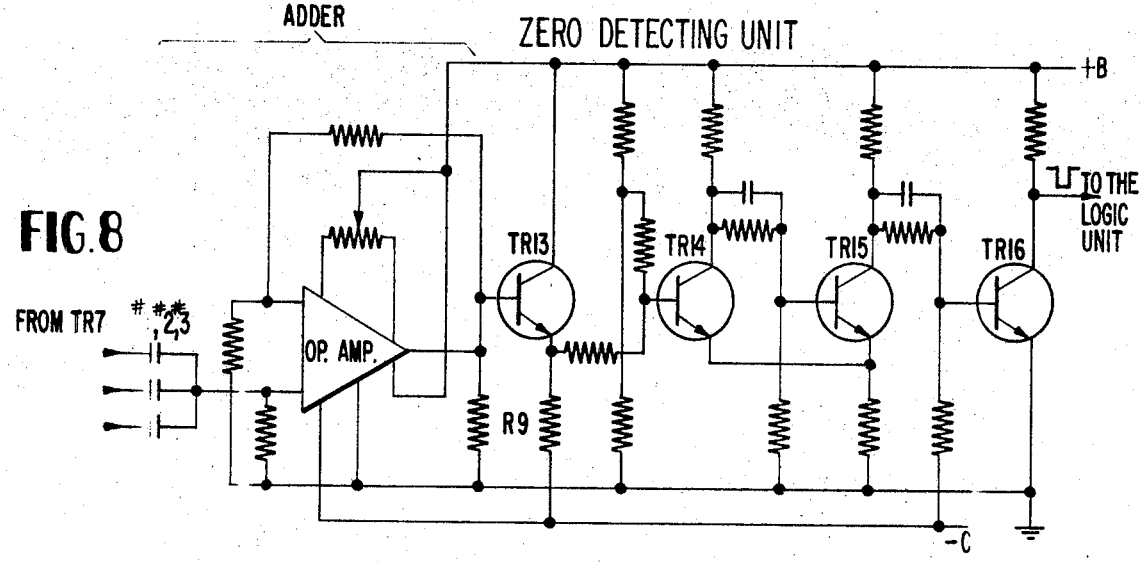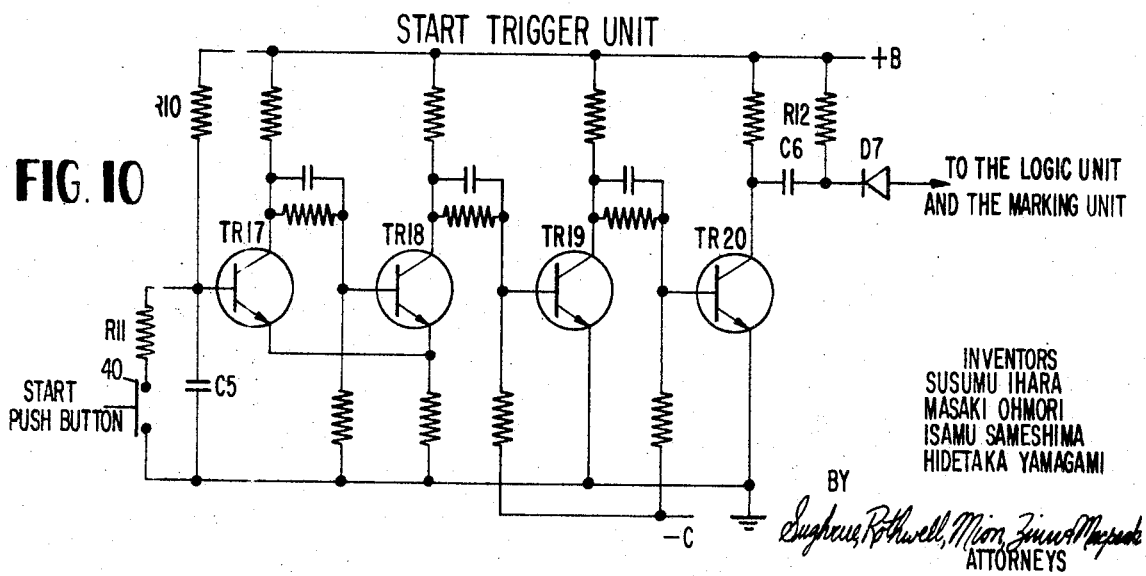

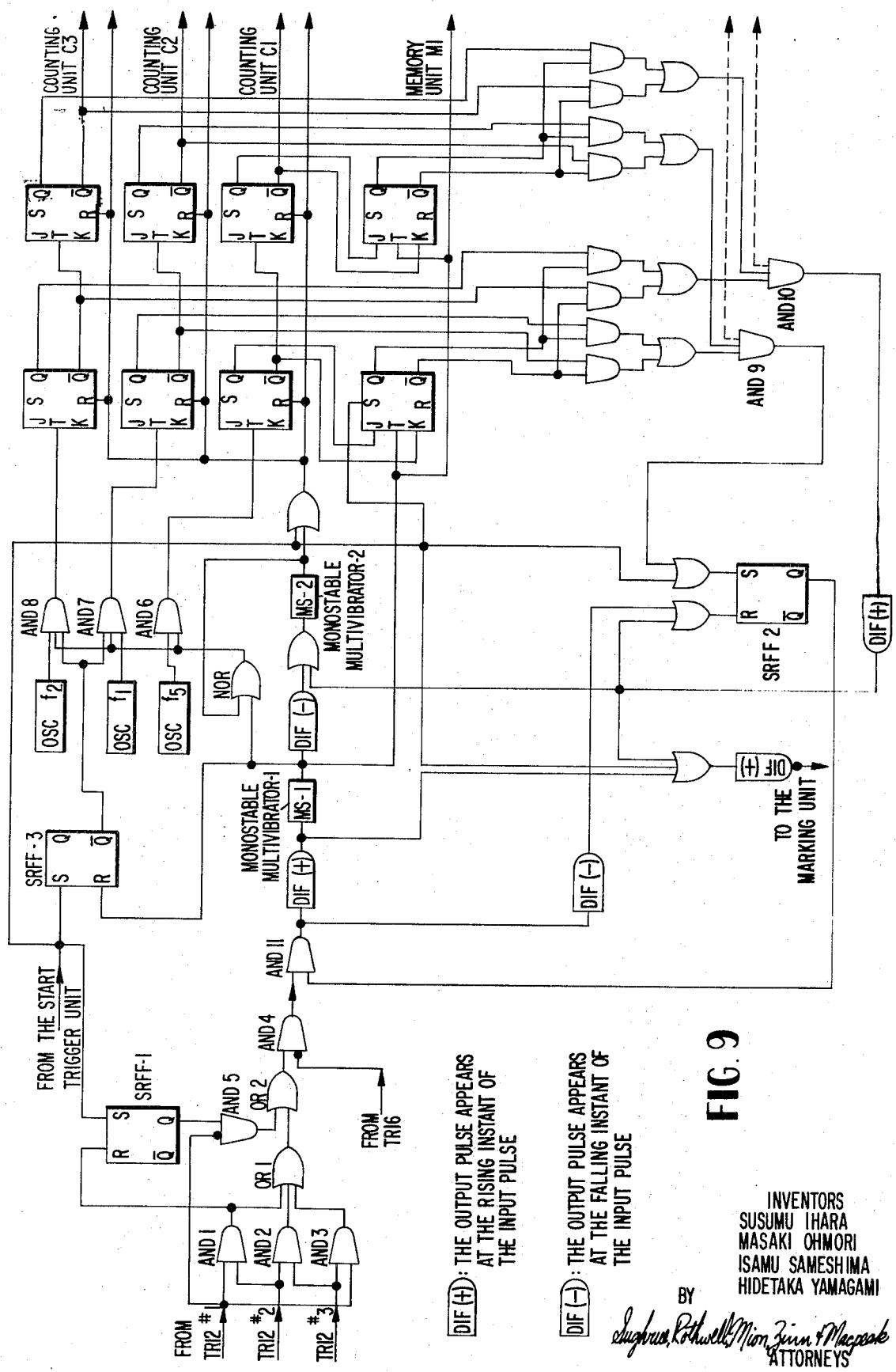

United States Patent Office 3,538,435
Patented Nov. 3, 1970

3,538,435
METHOD AND APPARATUS FOR AUTOMATICALLY MEASURING THE LENGTH OF A LONG MOVING OBJECT BY SENSING STATIC ELECTRIC CHARGES
Susumu Ihara, Nara, Masaki Ohmori, Nishinomiya-shi, Isamu Sameshima, Tokyo, and Hidetaka Yamagami, Kawasaki-shi, Japan, assignors to Kasuga Electric Manufacturing Company Limited, Tokyo, Japan, a company of Japan, and Sumitomo Electric Industries Ltd., Osaka, Japan, a company of Japan
Filed July 22, 1968, Ser. No. 746,548
Claims priority, application Japan, July 21, 1967, 42/46,647
Int. Cl. G01n 27/00
U.S. Cl. 324—71       6 Claims

ABSTRACT OF THE DISCLOSURE

Method of automatically measuring the length of long moving objects with non-conducting surfaces. An electric charge mark is placed on the insulating material and is sensed at preset distances away as it passes a plurality of sensing stations. The outputs of the different stations are compared to prevent erroneous reading of noise as the mark. The time interval between marks is compared with previous time intervals to exclude obvious noise. Counting the number of marks detected yields the length of cable.

BACKGROUND OF THE INVENTION

Field of the invention

This invention relates to a method of automatically measuring the length of a long moving object without contacting them.

Description of the prior art

For an example, the measurement of the length of an electric cable has heretofore been accomplished by the so-called "revolving measure" method in which a wheel having a given circumferential length is revolved in contact with the electric cable and the total number of the wheel's revolutions is counted. With such methods of measurement by mechanical contact, however, measurement errors caused, for example, by slipping on the wheel are unavoidable. Such errors are liable to become great especially where the electric cable moves at a high speed or with great variation in speed.

SUMMARY OF THE INVENTION

The present invention provides a method and apparatus for making accurate and dependable measurement even where the object moves at a high speed or with great variation in speed.

BRIEF DESCRIPTION OF THE DRAWINGS

FIGS. 3, 4, 7, 8, 9 and 10 are circuit diagrams specifically showing the marking electrode and marking unit, detecting electrode and pre amp., discriminating unit, zero detecting unit, logic unit, and start trigger unit respectively.

DESCRIPTION OF THE PREFERRED EMBODIMENTS

First, the principle of measurement according to the present invention will be explained, with reference to FIG. 1.

Figure 1:
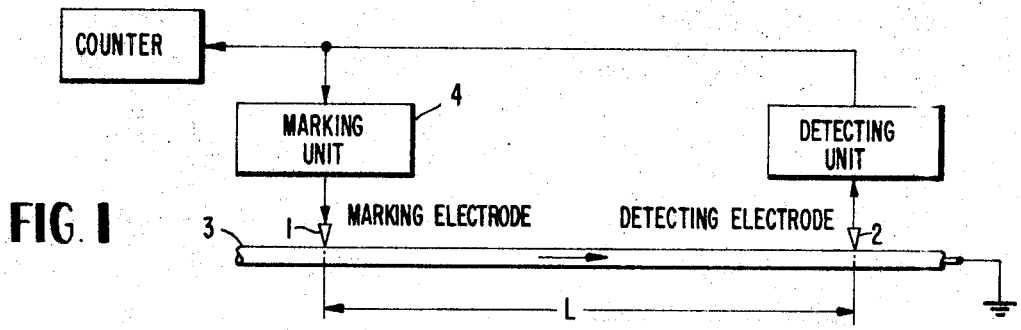
FIG. 1 is a diagram for the explanation of the method of measurement according to the present invention.

As shown in FIG. 1, each one of marking electrode 1 and detecting electrode 2 are provided along the direction in which an object 3 travels. The electrodes are fixed with a distance between them accurately equal to the unit length L for the measurement.

If first a marking unit 4 is triggered manually and a high impulse voltage is applied to the marking electrode, a corona discharge takes place at the electrode and electric charge is stored on the surface of the object which is passing by the electrode. The moment this charge passes by the detecting electrode is detected by electrostatic means, triggering the marking unit to store a new electric charge on the object.

By the above-described arrangement, the marking and detecting operation is automatically repeated as long as the object continues running.

If the number of triggers sent from the detecting unit to the marking unit is counted, the measurement value will be obtained by multiplying the basic unit length (L) by the counted number (N).

With the above-mentioned method, the measurement of length is carried out without contacting the object measured.

In addition, the marking and detecting action is carried out electrically at an extremely high speed, so that the length can be measured with a high accuracy even where the object moves at a high speed or with great variation in speed.

Now an apparatus embodying the above-described method of measuring length will be explained, with reference to FIG. 2.

As shown in the figure, three detecting electrodes 11, 12 and 13 are provided.

Along the direction in which the object travels, the marking electrode, detecting electrode 11, detecting electrode 12 and detecting electrode 13 are fixed in the order named, separated apart from each other accurately by the basic unit length L. The reason why three detecting electrodes are provided is as follows:

In order to avoid any erroneous operation of the apparatus which may be caused by noise due to other electric charge on the object than the mark, noise due to the oscillation of the object, damping of the charge due to water drops on the object, etc., it is so arranged by means of the logic unit, which will be explained later, that trigger is sent to the marking unit only when at least two of the three detecting electrodes simultaneously detect electric charges.

This is based on the fact that periodic or signal charges normally exist on the object at a distance of L from each other, so that they are detected simultaneously by the three electrodes.

On the other hand, even if one of the periodic charges on the object should become undetectable, for example due to damping by water drops on the object, the measuring operation can go on correctly by detecting the other two electric charges.

If an apparatus having only one detecting electrode as shown in FIG. 1 is employed, if an erroneous trigger is sent to the marking unit owing to noise due to such causes as already mentioned, an erroneous charge mark will be applied to the object. This erroneous mark will then be detected and the erroneous marking and detecting operation will be repeated overlapping the regular operation. On the other hand, if a single charge were to become undetectable for some reason, the measuring operation would then come to a sudden stop. Such an apparatus as shown in FIG. 1 is of limited practical use.

Figure 2:
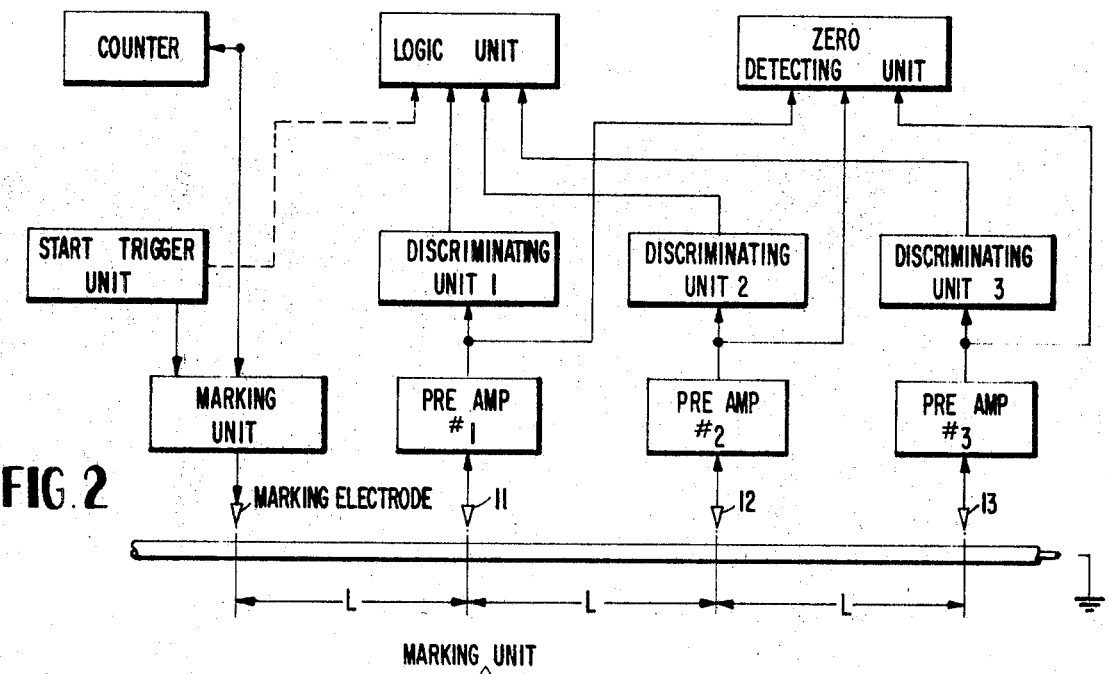
FIG. 2 is a block diagram showing the construction of apparatus embodying the present invention.

In the first operation of the measurement, using FIG. 2, there naturally is only one electric charge and charges cannot be detected by two or more detecting electrodes. However, the circuit is so arranged that a control signal is sent to the logic unit at the start of the operation, so that trigger will be sent to the marking unit if the detecting electrode 11 detects a charge, in the first operation of the measurement.

Further, in order to prevent the above-mentioned erroneous operations, the logic unit is so arranged as follows.

Considering the variation rate of the traveling speed, the maximum deviation rate ($\pm X$) between the time interval of the measuring operation and that of the last foregoing operation is decided beforehand. Everytime the mark is detected, the time interval T of the measuring operation is memorized. Any signal detected within the time interval $T(1-X)$ is ignored, being regarded as a noise.

On the other hand, if no signal is detected within the time interval $T(1+Y)$, where $$\left(Y = \frac{2X}{1-X}\right)$$

a new trigger is sent to the marking unit, the mark being regarded as having been missed. If X satisfies the condition that $(1-x)^2 > 2x$, i.e., $0 < x < 0.282$, the above-mentioned erroneous operations are perfectly prevented with little error of measurement.

In the worst case, a noise occurring within the time interval $T(1-x)$ is regarded as a signal. After detecting such a noise, the time interval $T(1-x)$ is memorized, and a trigger is sent to the marking unit. After this moment, within the time interval $T(1-x)^2$, any further detection signal is neglected.

The former periodic or regular mark will be detected within the time interval $2 \times T$ after this moment, but if $2 \times T < T(1-x)^2$, the former mark is neglected. The new mark caused by the noise will be detected between the time interval $T(1-x)$ and $T(1+x)$ after this moment. Because naturally $T(1-x)^2 < T(E-x)$, the new mark is detected, being regarded as a regular mark.

Further, because $T(1-X)(1+Y) = T(1+X)$ (because $$\left(Y = \frac{2X}{1-X}\right)$$

if no signal is detected within the time interval $T(1+X)$ after this moment, another new trigger is sent. Thus, after this moment, the measuring operation is carried out by the new mark caused by the noise, and the error of the measurement is not serious.

Now the circuit structure of each part of the apparatus will be explained specifically. Needless to say, the circuit structures may easily be changed to other types of general techniques known in the art.

Figure 3:
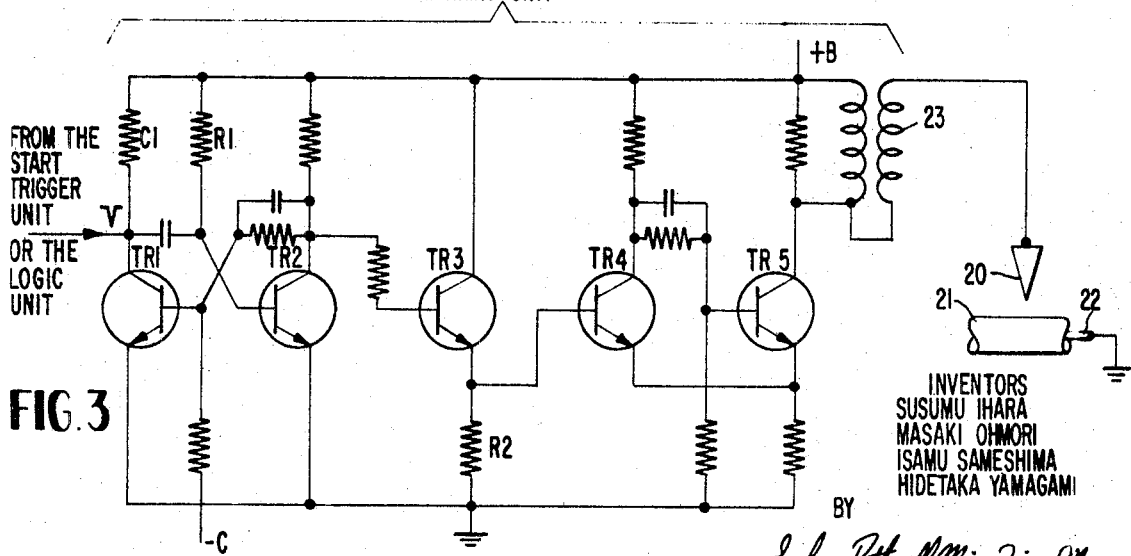

The marking electrode and marking unit will be explained with reference to FIG. 3.

The marking electrode 20 is a stylus having a sharp point. The object 21 is arranged to travel with a fixed distance from the tip. If the object is an electric cable, the core 22 of the cable is grounded at either the supply or the take-up end. For the impulse generator, an ignition coil 23 for an automobile engine may be used.

A constant electric current is caused to flow usually through transistor TR5 on the primary winding of the coil. When a trigger comes in from the start trigger unit or the logic unit, a pulse having a peak of about 10 kv. is generated on the secondary winding of the coil by switching off the TR5. The pulse is supplied to the stylus. TR1 and TR2 form a monostable multivibrator and usually are in the state wherein TR1 is OFF and TR2 is ON.

However, the moment a negative trigger comes in from the start trigger unit, or the logic unit to the collector of TR1, they are switched to the state wherein TR1 is ON and TR2 is OFF. They return to the original state after a fixed length of time, which is determined by the values of C1 and R1.

TR3 is a transistor for buffer and phase-shift use. When TR2 is ON or OFF, TR3 is respectively OFF or ON, so that the terminal voltage of the emitter resistance R2 of TR3 rises to a positive voltage from zero the moment TR2 becomes OFF. TR4 and TR5 form a Schmitt circuit and are usually in the state wherein TR4 is OFF and TR5 is ON. They are switched to the state wherein TR4 is ON and TR5 is OFF when the base voltage of TR4 rises above a preset value, and they return to the condition wherein TR4 is OFF and TR5 is ON when the base voltage comes down below the preset value.

Consequently, the moment a negative trigger enters TR1, TR5 switches off and an impulse is generated at the secondary winding of the coil. Then all the states at once return to the original state automatically.

The above-described pulse circuit is employed for the purpose of performing a stabilized marking operation by supplying the stylus with impulses of a constant peak, constant pulse width and constant time lag (though very small) each time.

Figure 4:
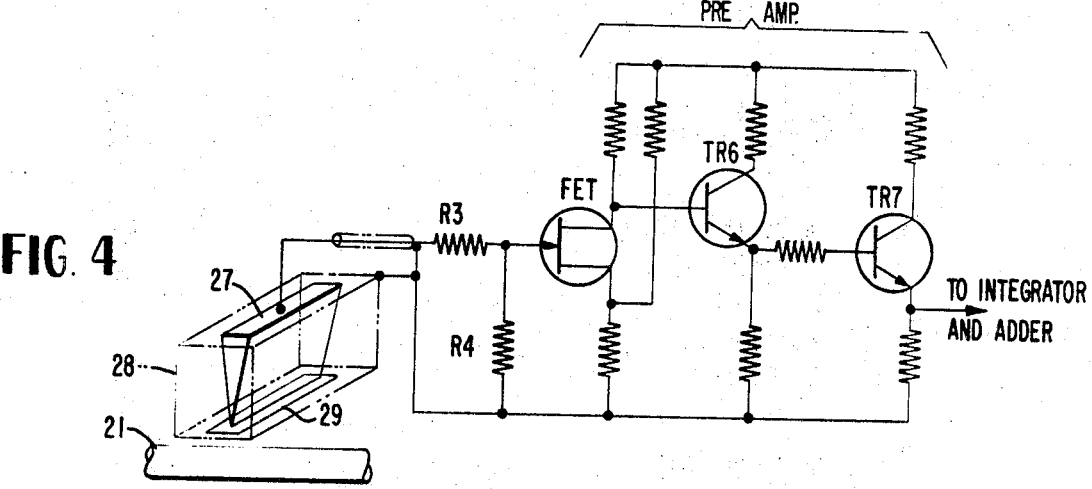

Referring to FIG. 4, the detecting electrode and the pre-amplifier will now be explained. The detecting electrode 27 is a chisel-shaped blade having a sharp straight-line up normal to the direction in which the electric cable 21 travels. The electrode is housed in a shield box 28 having a rectangular window 29 at the part facing the blade tip. The object is arranged to travel with a fixed distance from the blade tip.

The electrode is connected, via a comparatively small resistance R3, to the gate of the field effect transistor FET. The gate is connected to the ground by a resistance R4 of the order of a megohm. The FET is used because a very high input impedance is required for the first stage of the amplifier for detecting electric charge by the electrostatic effect. Since noise is likely to be induced if the input impedance is too high, it is lowered to a proper input impedance by means of the resistance R4 of the order of a megohm. TR6 and TR7 are emitter-follower transistors for buffer use.

Figure 5:
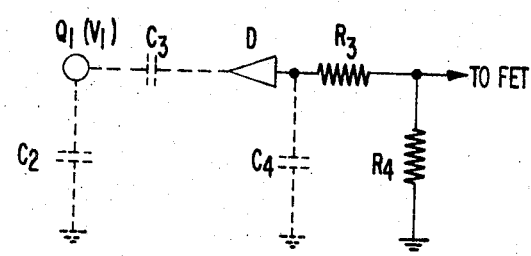
FIG. 5 is a diagram for explaining how signals are detected.

How an electric charge is detected by the electrostatic phenomenon is explained with reference to FIG. 5.

Suppose an electric charge Q1 ($V_1$) exists in the neighborhood of a detecting electrode D, where $R3=0$ and R4 is infinite.

Then, there naturally exist stray capacities C2, C3, and C4 between Q1 and the ground, Q1 and D, and D and the ground respectively, and a voltage $V_2$ is electrostatically induced on the electrode D where $$V_2 = \frac{C3}{C3+C4} V_1$$

and where $$V_1 = \frac{C3+C4}{C2C3+C3C4+C2C4} Q1$$

In the present invention, the electric charge travels and passes through the neighborhood of the electrode, and R3 and R4 have finite values, so that C3 and $R3+R4$ form a differentiation circuit. As shown in FIGS. 6A and 6B, a voltage having a waveform which is proportional to the differentiated value of the charge on the object in the vicinity of the electrode is induced on the electrode.

The zero point in the center of the detected signal, therefore, corresponds to the central point of the distribution of electric charge. This means that it will be correct to detect the zero point and send the trigger to the marking unit at this moment.

However, as the method of detection is of the differentiation type, the detected wave crest changes if the traveling speed changes, even if charges of a fixed amount are stored on the object. Thus the discrimination between noise and signal is not dependable and an erroneous operation is unavoidable. For this reason, three discriminating units as shown in FIG. 7 are used for the three pre-amplifiers, one for each one.

For the first stage of the unit, an integrator employing an operational amplifier is used, and the discrimination between noise and signal is made dependable by obtaining signals of a constant wave peak which is unrelated to the line speed. The differentiation characteristics at detection are compensated for by the integration characteristics of the integrator.

Figure 6:
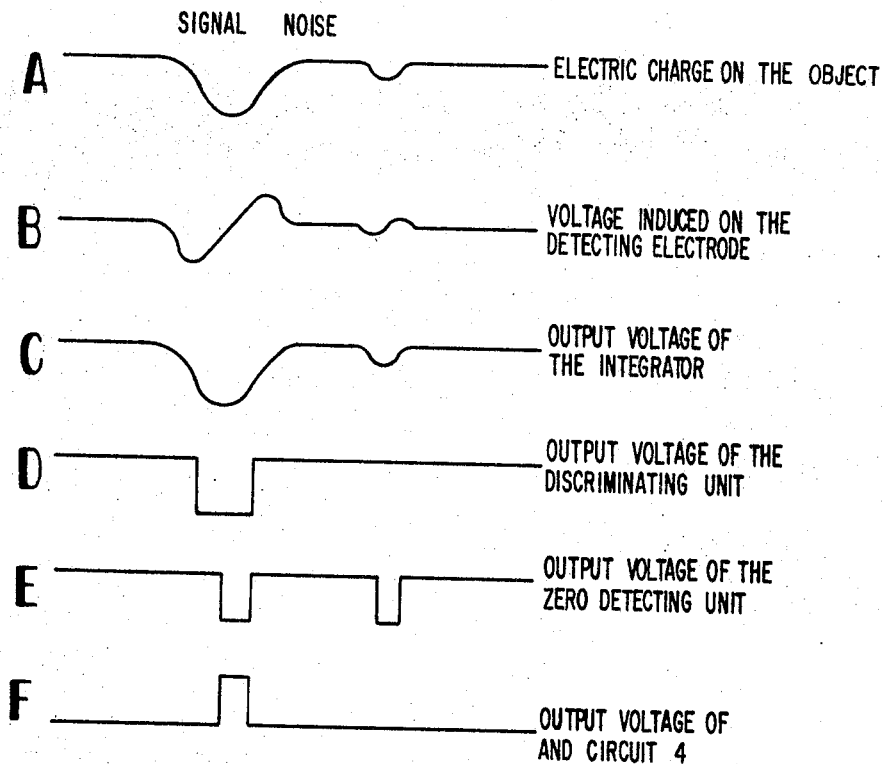
FIG. 6 is a graph showing how signals are processed by each unit of the apparatus.

As shown in FIG. 6, at C, the output of the integrator no longer has a central zero point, so that the central point of the charge is detected separately by a zero detecting unit.

R5 is a variable resistance for the adjustment of output gain of the integrator and can adjust the output wave peak to a suitable size. The transistors TR9 and TR10 form a Schmitt circuit, and TR8 is an emitter-follower for buffer use and transmits the integrator's output to the Schmitt circuit.

Ordinarily the base bias of TR9 is adjusted by R7, R8 so that TR9 is ON and TR10 is OFF. When the terminal voltage of the resistance R6 falls below a preset voltage, the state is switched so that TR9 is OFF and TR10 is OFF. When the terminal voltage returns above the preset voltage, the original condition is restored. TR11, TR12, are transistors for buffer and phase-shift use.

As shown in FIG. 6D, TR12 switches at the moment the integrator output falls below a preset value and the collector of TR12 issues a negative pulse. If the base bias of the Schmitt circuit of TR9 and TR10 has previously been preset at an appropriate value, it is possible to discriminate signal from noise without failure.

Referring to FIG. 8, the zero detecting unit will be explained. In the first stage of the unit is used an adder employing an operational amplifier, and the outputs of the three pre-amplifiers are added.

Consequently, the central zero point of its outputs is the mean position of the central zero points of the outputs of the three pre-amplifiers. TR13 is an emitter follower for buffer use, and TR14 and TR15 form a Schmitt circuit. Ordinarily they are in the state wherein TR14 is OFF, and TR15 is ON. However, when the terminal voltage of emitter resistance R9 of TR13 becomes above zero, they switch to the state wherein TR14 is ON, and TR15 is OFF. They return to the original state when the terminal voltage becomes below zero. TR16 is a transistor for buffer and phase-shift use. As shown in FIG. 6F, TR16 switches on and the collector issues a negative pulse at the moment when the output of the adder (namely, the three inputs shown in FIG. 6B added together) changes from below zero to above zero.

The logic unit will be explained with reference to FIG. 9.

The negative output pulses of the discriminating units #1, #2 and #3 are introduced to AND gates AND1, AND2 and AND3, as FIG. 9 shows.

Consequently, the positive output pulse of OR gate OR1 appears only when at least two of three negative output pulse of the discriminating units appear simultaneoutly.

Thus, the output of OR1 shows whether there is a regular charge or not, and is transmitted to AND4 via OR2, opening AND4.

The negative output pulse of the zero detecting unit is introduced to AND4, so the positive output pulse of AND4 appears at the moment when the center of regular charges pass by the detecting electrodes.

As already stated, a trigger must be sent to the marking unit by the detected signal of the detecting electrode 11 at the first measuring operation.

For this, the start trigger from the start trigger unit sets shift register flip-flop SRFF1 ON, and opening AND5.

Thus, the negative output pulse of the discriminating unit #1 opens AND4 via AND5 and OR2.

When the first charge arrives at the detecting electrode 12 and the second charge at the detecting electrode 11, the output pulse of AND1 appears, and resets SRFF1 closing AND gate 5.

Now, it will be explained, how the signals detected within the time interval $T(1-x)$ are ignored, and how a new trigger is sent to the marking unit when no signal is detected within the time interval $T(1+Y)$.

The oscillating frequencies $f_s$, $f1$ and $f2$ of three pulse oscillators are regulated in relations of $$f1=\frac{f_s}{1-x} \text{ and } f1=\frac{f_s}{1+Y}$$

where $$Y=\frac{2x}{1-x}.$$

Frequency $f_s$ should be determined by considering the resolution of the time interval memory, according to the traveling speed.

The outputs of three oscillators are respectively lead to three counting units 1, 2, 3 through AND gates 6, 7 and 8 and said counting units count the output of each oscillator only when SRFF3 and NOR gate NOR are simultaneously ON.

On the other hand, because the moonstable multivibrator MS1 is caused to operate at the rising instant of output pulse of AND gate 11 and the monostable multivibrator MS2 is caused to operate at the falling instant of output of the monostable multivibrator MS1, element NOR is OFF during the sum of duration times of the monostable multivibrator units MS1 and MS2, and for this interval, three counting units cease to count.

Because the output of the moonstable multivibrator MS2 appears at the falling instant of the input of the monostable multivibrator MS1, three counting units start to count frequencies $f_s$, $f_1$ and $f_2$ respectively, after the content of the counting unit CU1 has been memorized in the memory unit M1 by the output pulse of the monostable multivibrator MS1 and three counting units have been cleared by the output of the monostable multivibrator MS2. The content of the memory unit is the counted value of $f_s$ by a counting unit CU1 for the time from the start of count to the detection of a mark. Because $f_1$ equals $f_s/1-X$ the content of the counting unit CU2 which counts $f_1$ coincides with the content of the memory M1 and the output of AND9 appears, after the time interval of $(1-X)$ times of that of the foregoing operation. SRFF2 which gates AND11, is reset at the falling instant of the output pulse of AND11, and is set by the output pulse of AND9.

Thus AND11 is closed during the time interval of $T(1-X)$ after the detection of a mark and a new mark is not marked even if a signal is detected within this time interval.

On the other hand, because $f_2$ equals $f_s/1+Y$, the content of the counting unit CU3 which counts $f_2$ coincides with that of the memory unit M1. The output of AND10 appears if the output of AND11 does not appear within the time interval of $(1+Y)$ times of that of the foregoing operation, so a marking unit is caused to operate by said output and a new mark is marked. At the same time the monostable multivibrator MS2 is caused to operate, and AND11 is closed by the transition of SRFF2 to OFF at the rising instant of the said output. Now the output of the NOR element becomes OFF by the output of the monostable multivibrator MS2, and three counting units are caused to stop counting and are cleared. Then the next counting operation is made to start. As both gates of $T(1-X)$ and $T(1+Y)$ must not operate for the first mark, three counting elements are cleared by the start pulse, and AND7 and 8 are caused to be closed by setting SRFF2 to OFF. Only the counting unit CU1 operates during the first measuring operation. Besides, AND gate 11 is opened by setting SRFF2 to ON. When the first mark is detected, the monostable multivibrator MS1 is operated by the output of AND11 and resets SRFF2 to ON. Hereafter, the counting units CU2 and CU3 are controlled only by the output of the NOR element.

Finally, the start trigger unit will be explained with reference to FIG. 10.

The contact 40 of the start push button is open in the ordinary state. Capacitor C5 is charged with electric power from source B+ via a comparatively high resistance R10. The Schmitt circuit formed by TR17 and TR18 is in the state wherein TR17 is ON and TR18 is OFF. If the push button is pressed the moment the measuring operation is started, this contact is closed and the electric charge in C5 is quickly discharged via a comparatively low resistance R11 and the Schmitt circuit switches into the state wherein TR17 is OFF and TR18 is ON. If the push button is released, C5 is again charged via R10 and Schmitt returns to the original state. TR19 is a transistor for buffer and phase-shift use. TR20 switches on the moment TR18 switches on, and a negative trigger is fed to the marking unit and logic unit via D1 at the rising instant of this pulse by the differentiation circuit composed of C6 and R12.

We claim:

1. An improvement to the method of measuring the length of a long moving object having a nonconductive surface of providing two electrodes positioned a predetermined distance from each other and adjacent to said object, causing said object to move in a direction such that each incremental unit of said object first passes a first one of said electrodes, then passes the second one of said electrodes, applying a high voltage pulse to said first electrode to provide a residual charge mark to that part of said nonconductive surface which is adjacent to said first electrode at the instant of said pulse, detecting said residual charged part when said part passes under said second electrode by generating a first detection signal, applying an additional high voltage pulse to said first electrode in response to said first detection signal, and automatically repeating the operation for the length of the cable, said improvement comprising:

(a) providing a third and a fourth electrode by spacing said third electrode said predetermined distance along said object from said second electrode and on the side of said second electrode removed from said first electrode and by spacing said fourth electrode said predetermined distance along said object from said third electrode and on the side of said third electrode removed from said second electrode, (b) detecting any residual charged part passing under said third electrode by generating a second detection signal, (c) detecting any residual charged part passing under said fourth electrode by generating a third detection signal, (d) generating a trigger signal when at least two of the three said detection signals occur substantially simultaneously, and (e) applying said additional high voltage pulse in response to said trigger signal.

2. A method according to claim 1 further comprising:

(a) storing a signal proportional to the time interval between the detection of two successive regions of residual charge, (b) predetermining the maximum allowed deviation between successive time intervals, (c) comparing a signal proportional to the time interval to the next successive region of residual charge with said stored signal and said deviation, (d) inhibiting detection of the next successive region of residual charge if said comparison indicates a time deviation greater than said predetermined deviation, and (e) generating a new residual charge mark at said first electrode if no region of residual charge is detected within said predetermined time interval deviation.

3. A method according to claim 2 wherein the generating of a new residual charge mark occurs at a time proportional to $T(1+Y)$ where $T$ represents said stored signal and $$Y = \frac{2X}{1-X}$$

where $X$ represents said maximum deviation.

4. An improved apparatus for measuring the length of a long moving object having a nonconductive surface comprising:

(a) a marking electrode situated adjacent to said object for placing an electrical charge on a region of said nonconductive surface in response to a trigger signal, (b) a first sensing electrode situated adjacent to said object and removed from said marking electrode by a predetermined distance in the direction of movement of said cable for detecting the presence of a charge on a region of said nonconductive surface and for generating a first detection signal when a charge is detected, (c) trigger means responsive to said first detection signal for generating said trigger signal, (d) a second sensing electrode situated adjacent to said object and removed from said first sensing electrode by said predetermined distance in the direction of movement of said object for detecting the presence of a charge on a region of said nonconducting surface and for generating a second detection signal when a charge is detected, and (e) a third sensing electrode situated adjacent to said object and removed from said second sensing electrode by said predetermined distance in the direction of movement of said object for detecting the presence of a region of said nonconductive surface and for generating a third detection signal when a charge is detected, and wherein (f) said trigger means is responsive to the three said detection signals for generating said trigger signal when at least two of said detection signals are substantially simultaneously present.

5. An apparatus according to claim 4 further comprising:

(a) three discriminating units connected respectively to each of the three said sensing electrodes for integrating signals from said electrodes to respectively provide the three said detection signals, whereby the differentiation characteristics of the detector are compensated for by the integration characteristics of the discriminating units.

6. An apparatus according to claim 4 further comprising:

(a) means for amplifying said first detection signal, (b) an integrating discriminator to receive the amplified detection signal for generating an integrated signal relatively free of noise, (c) a first Schmitt circuit set to zero level with said amplified detection signal as an input for detecting the zero point of said amplified detection signal, (d) a second Schmitt circuit with said integrating signal as an input for gating said integrated signals, and (e) an AND gate circuit connected to receive the outputs from both Schmitt circuits, whereby the output of said AND gate is used to control said trigger means.

References Cited

UNITED STATES PATENTS 3,303,419    2/1967    Gith _____ 324—71

EDWARD KUBASIEWICZ, Primary Examiner

U.S. Cl. X.R.

33—125